(12) United States Patent
Kesavan et al.

(10) Patent No.: US 9,162,606 B2
(45) Date of Patent: Oct. 20, 2015

(54) MULTI-VEHICLE SURVEILLANCE SYSTEM

(75) Inventors: Vijay Sarathi Kesavan, Hillsboro, OR (US); Victor Lortz, Beaverton, OR (US); Xingang Guo, Portland, OR (US); Anand Rangarajan, Hillsboro, OR (US); Somya Rathi, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 84 days.

(21) Appl. No.: 13/977,455

(22) PCT Filed: Dec. 28, 2011

(86) PCT No.: PCT/US2011/067647
§ 371 (c)(1),
(2), (4) Date: Jun. 28, 2013

(87) PCT Pub. No.: WO2013/100993
PCT Pub. Date: Jul. 4, 2013

(65) Prior Publication Data
US 2014/0225719 A1    Aug. 14, 2014

(51) Int. Cl.
*B60Q 1/00* (2006.01)
*B60R 16/02* (2006.01)

(52) U.S. Cl.
CPC .. *B60Q 1/00* (2013.01); *B60R 16/02* (2013.01)

(58) Field of Classification Search
CPC .................................. B60Q 1/00; B60R 16/02
USPC ......... 340/425.5, 426.14, 429, 438, 540, 541, 340/937
See application file for complete search history.

(56) References Cited

U.S. PATENT DOCUMENTS

| 5,801,618 | A  | * | 9/1998  | Jenkins ................... 340/426.14 |
| 6,741,165 | B1 |   | 5/2004  | Langfahl et al. |
| 7,129,838 | B2 | * | 10/2006 | Shimomura et al. .......... 340/541 |
| 7,825,780 | B2 |   | 11/2010 | Pitt |
| 2003/0041329 | A1 |   | 2/2003  | Bassett |
| 2004/0203577 | A1 | * | 10/2004 | Forman et al. ............. 455/404.2 |
| 2005/0099273 | A1 |   | 5/2005  | Shimomura et al. |
| 2012/0162423 | A1 | * | 6/2012  | Xiao et al. .................... 348/148 |

FOREIGN PATENT DOCUMENTS

| EP | 1437272       |   | 7/2004 |
| JP | 2004280696    | A | 7/2004 |
| JP | 2004355565    | A | 12/2004 |
| JP | 2005258932    | A | 9/2005 |
| KR | 100455877     | B1| 11/2004 |

OTHER PUBLICATIONS

International Search Report and Written Opinion, Sep. 14, 2012, 10 pages, International Application No. PCT/US2011/067647, Korean Intellectual Property Office, Metropolitan City, Korea.
Japanese Office Action for Patent Application No. 2014-545879, dated May 1, 2015.
European Search Report and Written Opinion for Application No. 11878430.5. dated Aug. 27, 2015, 5 pages.

* cited by examiner

*Primary Examiner* — Tai T Nguyen
(74) *Attorney, Agent, or Firm* — Marger Johnson

(57) ABSTRACT

A multi-vehicle surveillance system includes vehicles that sense alarm-triggering events and activate various surveillance devices that can best capture data relating to the alarm-triggering events. The surveillance devices are activated based on the location and other information relating to the vehicle where the alarm-triggering event is sensed.

21 Claims, 5 Drawing Sheets

MULTI-VEHICLE SURVEILLANCE SYSTEM

TECHNICAL FIELD

The disclosure relates generally to surveillance systems, and more specifically to multi-vehicle surveillance systems.

BACKGROUND

Vehicle alarm systems have become commonplace for consumers, although their value is limited because so many false positive alarms are triggered and nothing more than the alarm sounding occurs when the alarm is triggered. A growing trend in the auto industry is integrating electronic devices within a car like a global positioning system (GPS), digital video display (DVD) players, tablets, in-vehicle entertainment systems, and the like. These features are attractive for criminals to steal. However, with alarm systems having limited success in deterring criminals from damaging a vehicle or stealing items from a vehicle, these electronic devices and vehicles in general are left largely exposed to the risk of criminal activity.

Further, when a vehicle alarm is triggered because a crime has occurred, little, if any, evidence or data is documented to help create a record of the incident for law enforcement, insurance companies, and others. While the alarm system sounds an alarm that the crime has occurred, law enforcement often take several minutes or longer to arrive at the scene to investigate the crime, if at all, which gives the criminal ample time to escape without being identified. In some environments, such as a parking garage or other property, owners sometimes place security cameras in various locations in hopes of preventing crime on their property. These systems are expensive to install and maintain, time-consuming to monitor, and inefficient at providing photos or video at the best angle for catching criminal (or simply unwanted or unauthorized) activity on their property. Because they often fail to capture useful information about an incident when it occurs, their value is also limited.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Figure 1:
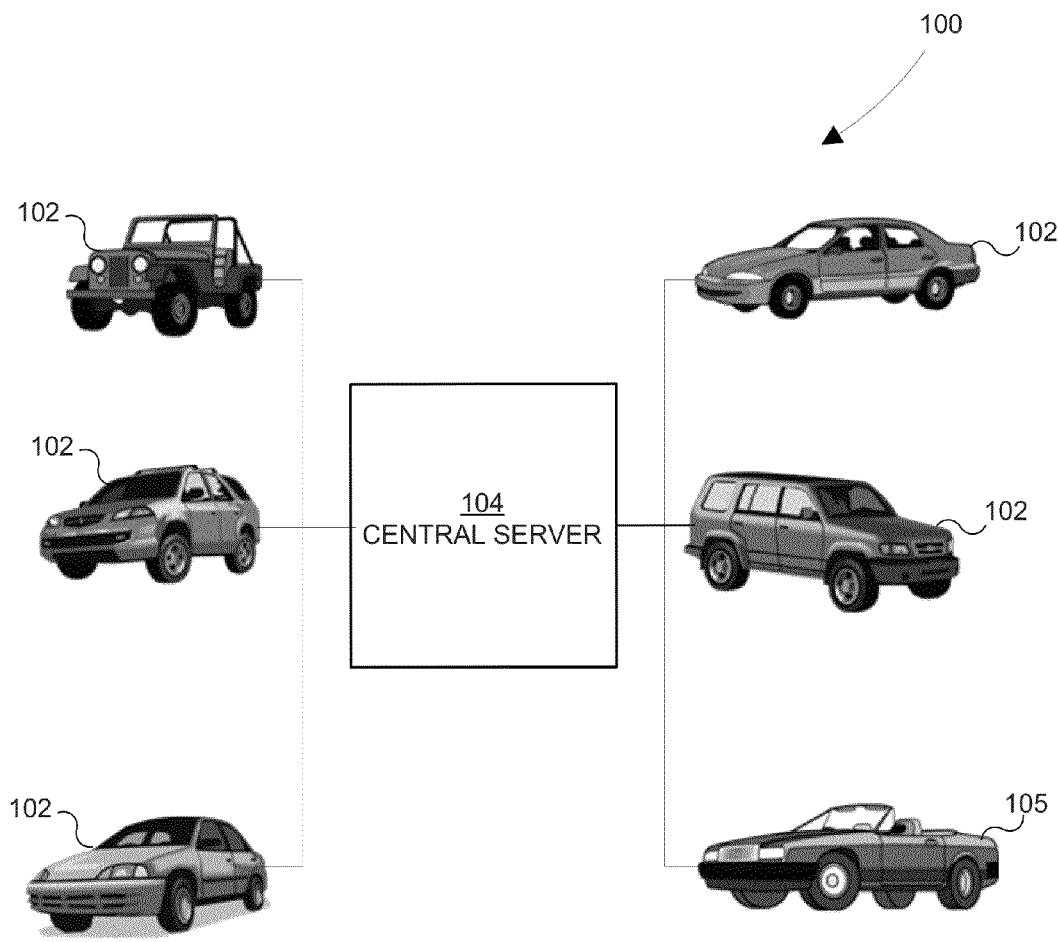
FIG. 1 is a block diagram of an example of a multi-vehicle surveillance system, according to embodiments.

FIG. 1 illustrates a vehicle surveillance system 100 in which multiple vehicles 102 are all electrically coupled to a common central server 104. Each vehicle 102 is wirelessly coupled to the central server 104 in this example, although alternative methods of connection may be used. The central server 104 is any suitable central computing device and provides a platform for data to flow between each of the vehicles 102 and the central server 104. The central server 104 may include various computing elements such as a processor, memory, transceiver, and a user interface, although any one or more of these elements is optional. Each vehicle 102 is any type of vehicle and includes automobiles, trucks, vans, buses, and other vehicular modes of transportation.

The vehicle surveillance system 100 shown in FIG. 1 includes various sensors (not shown in FIG. 1) that detect alarm-triggering events when they occur. The sensors include proximity, collision, and motion sensors and/or any other sensors that are capable of sensing data or activity relevant to whether an alarm-triggering event occurs within the proximity of a vehicle. The sensors are positioned proximate to or generally nearby each of the vehicles in the surveillance system. In one configuration, the sensors are positioned remote from a vehicle in the system, although these sensors are still able to capture and collect data regarding alarm-triggering events near or on the vehicle itself. For example, sensors may be positioned on nearby buildings or other structures and monitor for alarm-triggering events within the proximity of a vehicle. More specifically, an audio sensor may be secured to a building near a group of cars parked at a car dealership. When the audio sensor senses an alarm-triggering event, such as a sound of broken glass or an ignition starting a car's engine at an unauthorized time of day (e.g. after closing hours in the car dealership example), the sensor commences a surveillance method of the vehicle or a group of vehicles in proximity to where the alarm-triggering event was sensed.

In another example, the sensor, and sometimes multiple sensors, is secured to at least one vehicle within the surveillance system. As in the example described above, these sensors sense alarm-triggering events and commence surveillance on one or more vehicles within the surveillance system once an alarm-triggering event has occurred. Sensor(s) are secured to each vehicle coupled to the central server, although in alternative configurations one or more vehicles in the surveillance system may not have a sensor. In the car dealership scenario described above, one or more sensors are secured to each vehicle within the surveillance system. The sensors secured to a particular vehicle detect alarm-triggering events that occur near that vehicle. Sometimes, sensors secured to a particular vehicle detect alarm-triggering events that occur on a different vehicle that is near or generally near the particular vehicle.

The sensors in these vehicles activate a surveillance device based on the data that is sensed that indicates that an alarm-triggering event occurred. One or more surveillance devices is activated and then collects information about the vehicle in which the alarm-triggering event occurred. That information is then sent to and received by the central server. The central server may share that information with other vehicles within the surveillance system, law enforcement, and any other authorized user either in real-time or at a later time. The information may be stored in an optional memory within the central server or in some other remote location. The collection and storage of this data may be secure and any transmission encrypted or otherwise protected against tampering for use later in legal proceedings, by insurance companies, by government entities, and the like.

Figure 2:
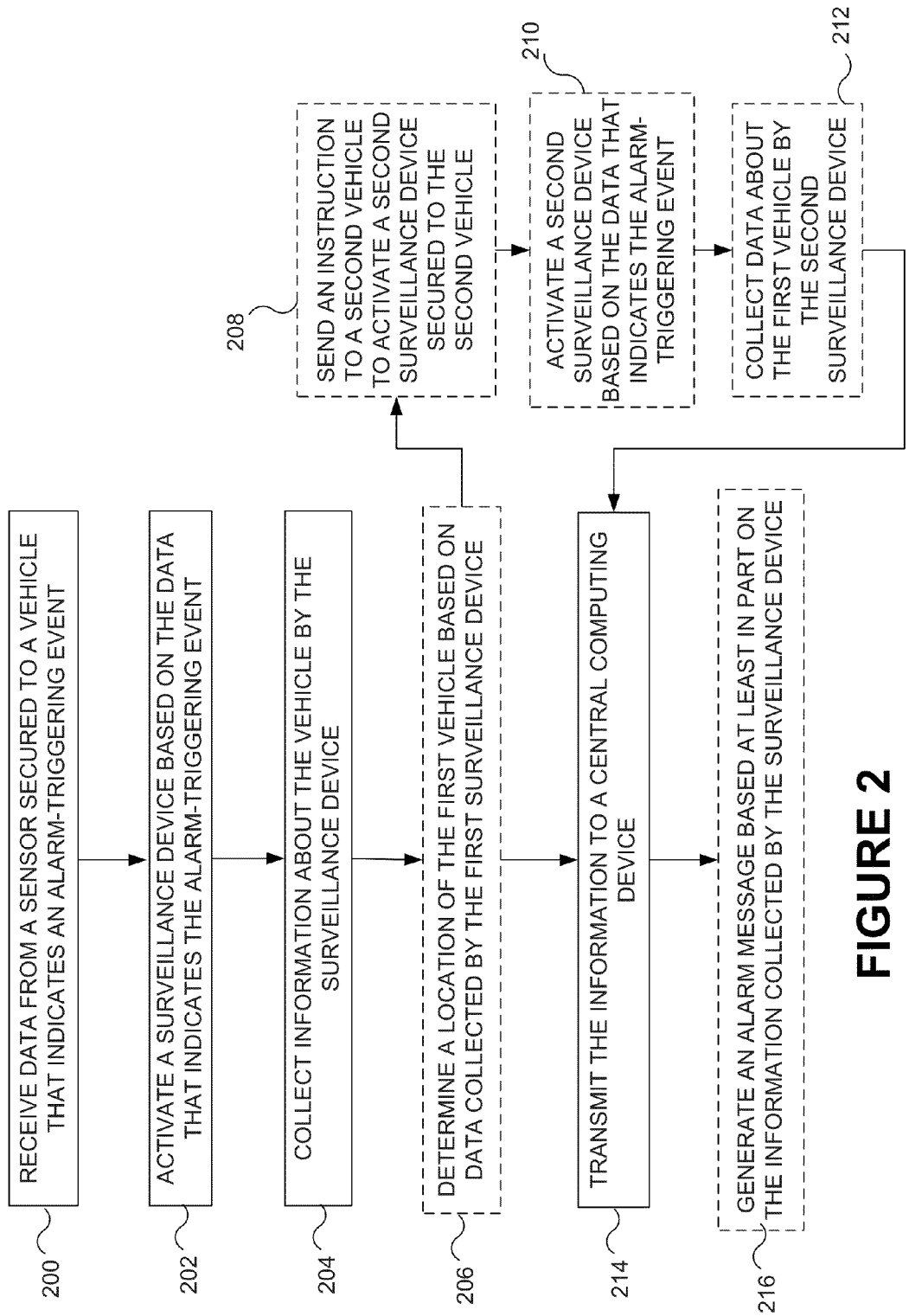
FIG. 2 is a flow diagram illustrating an example method of vehicle surveillance, according to embodiments.

FIG. 2 shows a method of surveillance of a vehicle from the perspective of the central server. The central server receives data from a sensor that is secured to a vehicle that indicates an alarm-triggering event in a process 200 and the central server sends an instruction to the vehicle to activate a surveillance device on the vehicle that is based on the data received from the sensor in a process 202. In a process 204, the instruction to the surveillance device includes sending an instruction for the surveillance device to collect information about the vehicle. That information is optionally sent back to the central server in a process 206 and a location of the vehicle is determined by the central server based on the information collected about the first vehicle. Optionally, the central server sends an instruction to a second vehicle to activate a second surveillance device that is secured to the second vehicle in a process 208. The second vehicle then activates the second surveillance device in a process 210 so that the second surveillance device on the second vehicle can collect information about the first vehicle and/or the area around the first vehicle where the alarm-triggering event occurred in a process 212. The information collected by both the first surveillance device and the second surveillance device is transmitted to the central server in a process 214. In some configurations, an alarm message is generated that is based on the information collected by the surveillance devices in a process 216. The alarm message may be generated and sent out by the central server or one of the vehicles.

The surveillance device(s) activated when an alarm-triggering event occurs includes any suitable device that is capable of collecting information about the vehicle in which the alarm-triggering event occurred. Surveillance devices include global positioning systems (GPS), still and video cameras, in-vehicle communication systems such as hands-free units that have microphones and speakers, emergency monitoring systems that help people when a problem, such as a crash, is detected, and any other suitable surveillance device. These surveillance devices can collect audio and visual information about the vehicle in which the alarm-triggering event occurred. The surveillance device(s) may be secured to the vehicle in which the alarm-triggering event occurred, another vehicle within the surveillance system, and/or a surveillance device that is included in a non-vehicle security system, such as a security system in a parking garage, shopping mall, or office complex.

For example, a sensor monitoring a vehicle detects that an alarm-triggering event occurred and activates multiple surveillance devices secured to that same vehicle including the vehicle's GPS, back-up camera, and emergency monitoring system that calls for emergency assistance immediately and records audio within and around the vehicle. The information collected by the surveillance devices can be used to help apprehend the person(s) responsible for committing a crime that triggered the alarm-triggering event and can serve as evidence in any legal proceedings and insurance matters that result from the alarm-triggering event.

Each of the surveillance devices may be included in an in-vehicle computing sub-system and each of these sub-systems may be coupled to each other through a controller-area network (CAN) bus that allows sub-systems within a vehicle to communicate with each other without a host computer such that the collected data is aggregated across multiple (or all) of the vehicle's sub-systems. The in-vehicle computing system is preferably physically located within the vehicle itself. This configuration facilitates sharing of data between sub-systems for enhanced surveillance of the vehicles within the surveillance system. Each sub-system may include its own central computing device that has one or more of a processor, controller, and memory that executes functions based on data sensed (if the sub-system includes sensors) and collected by the sub-system. In alternative configurations, the sub-systems communicate directly with the central server and do not have direct sub-system level processing capabilities. In this way, all in-vehicle sub-systems that sense data and collect information about a particular vehicle communicate with one another either through a direct sub-system to sub-system communication and/or through the central server.

In another example, sensors detect an alarm-triggering event that occurs in a vehicle and activates one or more surveillance devices that are secured to a vehicle that is near the vehicle where the alarm-triggering event occurred. The second vehicle that is near the vehicle where the alarm-triggering event occurred may include one or more corresponding sub-systems similar to those present in the vehicle where the alarm-triggering event occurred, as described above. For example, both the vehicle where the alarm-triggering event occurred and the second vehicle include a GPS, camera(s), and emergency response sub-systems. Each vehicle's sub-systems are coupled to each other, although the sub-systems between the two vehicles are not coupled directly together. In some examples, the sub-systems of each vehicle can communicate with each other directly through any suitable type of wireless communication link and can exchange data directly without sending data to the central server. Direct vehicle-to-vehicle communication may be restricted to emergencies, such as any alarm-triggering event or only those events having a suspected physical injury to a person, for example. Otherwise, all vehicles within the surveillance system send data to and receive data from the central server that determines the vehicle(s) surveillance device(s) that should be activated based on the data sensed by the sensor(s).

In still other examples, the surveillance device is included in a non-vehicle security system. Some entities like shopping malls, parking garages, car dealerships, and office complexes, have existing security systems that have surveillance devices. These surveillance devices may be included in the vehicle surveillance system as well. For example, a security system is installed at a shopping mall in which multiple cameras are secured at various locations within and around a parking lot and exterior of the building of a shopping mall and are electrically coupled to the vehicle surveillance system. An alarm-triggering event is sensed by a sensor in a vehicle and data from the sensor is received at the central server. The central server determines the location of the vehicle where the alarm-triggering event occurred and activates one or more of the cameras in the shopping malls security system based on the location of the vehicle to best collect information about the vehicle. The cameras in the shopping mall's security system that are closest to and can obtain the best type and/or amount of information about the vehicle are activated by the central server based on the location of the vehicle where the alarm-triggering event occurred. The shopping mall security system's cameras may be the only surveillance devices that are activated or they may be activated along with other surveillance devices located within the vehicle in which the alarm-triggering event occurred or any other vehicle near the vehicle where the alarm-triggering event occurred.

In another example, various surveillance devices may be secured to structures along public roadways, such as cameras located at stoplights and along freeways. These cameras also may be included as surveillance devices that are electrically coupled to the central server such that they may be activated when an alarm-triggering event occurs within their proximity so that they collect information about the vehicle in which the alarm-triggering event occurred.

Furthermore, when data indicating that an alarm-triggering event occurs is received by a central server electrically coupled to one or more linked vehicle surveillance systems, the central server can send an instruction to one or more of the vehicle surveillance systems to capture and archive more detailed video or other sensor data from cameras in the vicinity of the alarm-triggering event. By selectively archiving more extensively in regions and time frames of particular interest, the vehicle surveillance system(s) capture the highest-quality information and use storage and network bandwidth resources efficiently while preserving evidence that is likely to be relevant to an alarm-triggering event such as a resulting criminal investigation, legal proceeding, and/or insurance claim relating to the alarm-triggering event.

Each surveillance device scenario previously described may be combined into a single scenario, in which surveillance devices within the vehicle where the alarm-triggering event occurred, surveillance devices in vehicle(s) near the vehicle where the alarm-triggering event occurred, and non-vehicle surveillance devices are all coupled to the central server and any one or more may be activated, as needed. For example, a sensor on a vehicle parked at a car dealership detects a vehicle window is broken. The central server receives data about the broken window from the sensor and activates the in-vehicle GPS and camera on the vehicle to determine the vehicle's location. Once the vehicle's location has been determined the central server then activates cameras on the two vehicles parked next to the vehicle in which the window was broken and cameras on the car dealership's security system that are capturing images or video of the vehicle in which the window was broken. All of these surveillance devices collect information about the vehicle that is transmitted to the central server.

Multiple vehicle surveillance systems may be electrically coupled to each other to create a linked network of vehicle surveillance systems that communicate with each other. If an alarm-triggering event occurs within one surveillance system, its central server communicates with a linked surveillance system if the central server determines that information collected by a surveillance device within the neighboring surveillance system would be useful. The surveillance system within which the alarm-triggering event occurs can send an instruction to any number of linked surveillance systems to activate its surveillance device(s) to collect information about the vehicle where the alarm-triggering event occurred.

For example, a break-in occurs at a vehicle within a surveillance system. The central server of the surveillance system receives data from the sensor on the vehicle indicating that the break-in occurred. The central server sends an instruction to the vehicle's GPS and in-vehicle camera to activate and collect information about the first vehicle including the vehicle's location. The GPS and in-vehicle camera collect the necessary information and send it back to the central server. The central server determines that the vehicle is moving and has likely been stolen based on the information received from the vehicle's GPS and in-vehicle camera. In this example, based on the GPS coordinates of the vehicle, the central server determines that the vehicle is moving toward the border of the surveillance system and thus no surveillance devices within the surveillance system will be able to continue to collect information about the vehicle. The central server determines that surveillance devices of a neighboring surveillance system can collect useful information about this vehicle and sends an instruction to the neighboring central server requesting activation of the necessary surveillance device(s) and information about the stolen vehicle continues to be collected.

In any of the surveillance system examples described above, the vehicle may include an audio or other sensory alarm system. These alarm systems may be a traditional loud buzzing or ringing noise, such as a siren, which audibly indicates to people nearby that an alarm-triggering event may have occurred. This sensory alarm system may commence after the alarm-triggering event is sensed and either before or after the surveillance device(s) on the vehicle where the alarm-triggering event occurs are activated. The central server also may send an instruction to vehicles near the vehicle where the alarm-triggering event occurred or a non-vehicle security system to commence their respective sensory alarm systems as well, thereby amplifying the deterring effect of the sensory alarm. In some examples, a confirmation of the alarm-triggering event is determined by the central server based on information collected by the surveillance device(s) on the vehicle where the alarm-triggering event occurs (or any other active surveillance device) prior to commencing sensory alarms of other vehicles or security systems to prevent false alarm-triggering events from causing multiple sensory alarms from commencing in multiple vehicles and security systems.

An alarm message may be generated based on the information collected by one or more of the surveillance devices and may be sent to any suitable entity or person, such as law enforcement and emergency response entities, like paramedics and firemen. The alarm message may only indicate that an alarm-triggering event occurred or may contain any suitable information collected by one or more surveillance device(s) such as images, video, GPS coordinates, audio, and the like. The alarm message may be sent to multiple entities, such as law enforcement and paramedics, tailored for the type of alarm-triggering event that is sensed. For example, a driver of a vehicle is hit by another vehicle that attempts to flee the scene of the accident. Surveillance devices secured to vehicle and a nearby traffic light collect information that indicates that the driver has suffered injuries and needs a paramedic. The surveillance devices also collect information about the vehicle that fled the scene of the accident, such as an image of the driver and the license plate number of the vehicle, which is sent to law enforcement to help them apprehend the driver that fled the scene of the accident either in real-time or at a later time.

Figure 3:
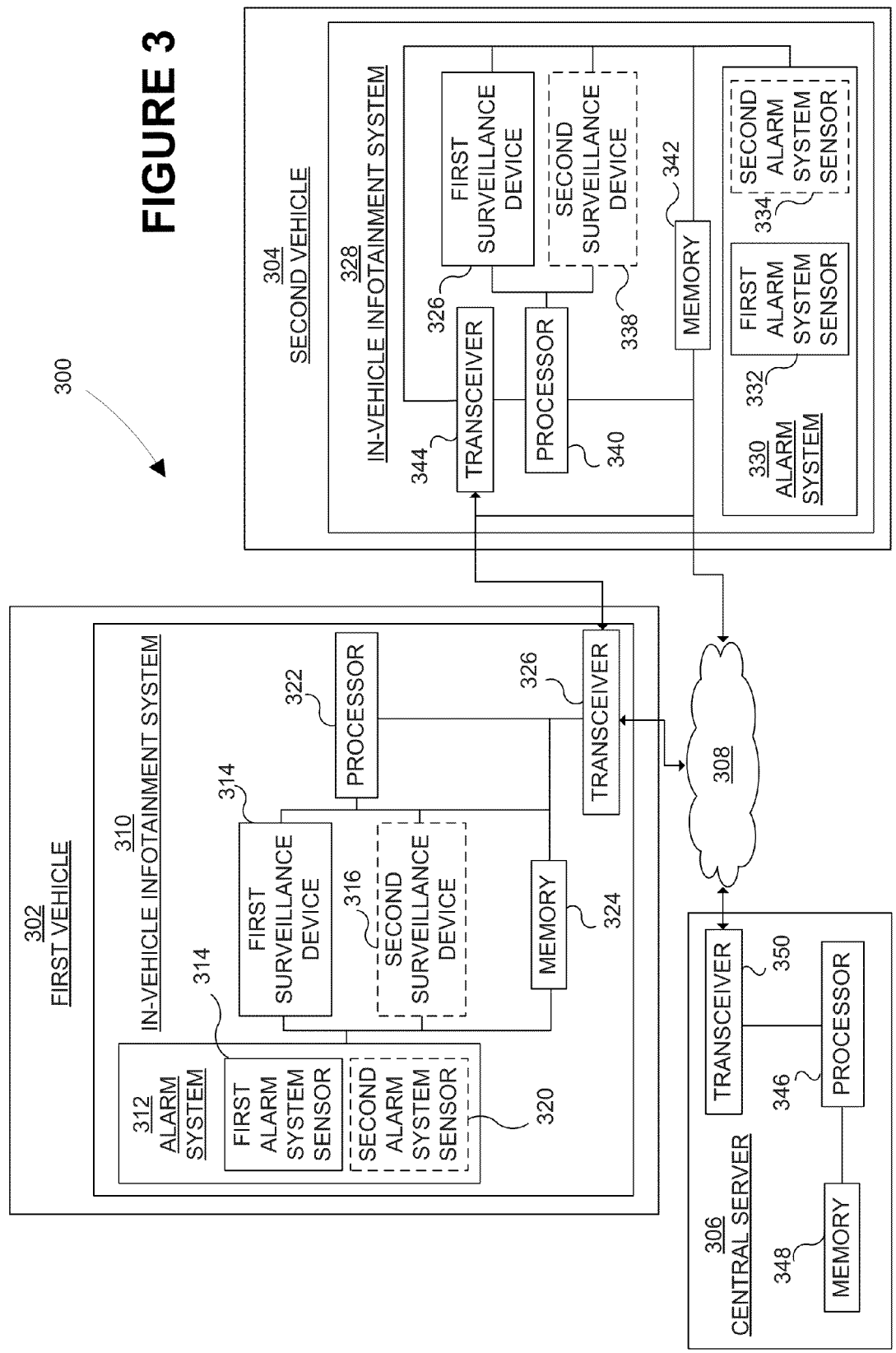
FIG. 3 is a functional block diagram that shows components of the multi-vehicle surveillance system shown in FIG. 1.

FIG. 3 is a functional block diagram of a portion of a surveillance system 300 that generally includes a first vehicle 302, a second vehicle 304, and a central server 306. The first vehicle 302 and the second vehicle 304 are wirelessly coupled to the central server 306 through the Internet 308 or any suitable wireless platform. In this example, the first vehicle 302 and the second vehicle 304 are also wirelessly coupled to each other directly, although they also may send and receive messages to each other through the central server 306 as well. The first vehicle 302 includes an in-vehicle infotainment system 310 that is the central computing system for all of the sub-systems within the first vehicle 302. The first vehicle 302 also has an alarm system 312 and two surveillance devices 314, 316 that directly communicate with each other. The alarm system 312 includes a first alarm system sensor 318 and an optional second alarm system sensor 320. These sensors 318, 320 may be the same type of sensor or may be different types of sensors. The in-vehicle infotainment system 310 also includes a processor 322, memory 324, and transceiver 326. The processor 322 analyzes, manipulates, compiles, and otherwise directs data sensed by the sensors 318, 320 and collected by the surveillance devices 314, 316. The memory 324 stores the data sensed by the sensors 318, 320 and collected by the surveillance devices 314, 316. The transceiver 326 sends and receives data that includes messages and/or instructions or other communications with the second vehicle 304 and the central server 306.

The second vehicle 304 also includes an in-vehicle infotainment system 328 that is the central computing device for all of the sub-systems within the second vehicle 304 including the second vehicle's alarm system 330 with two sensors 332, 334 and the first and second surveillance devices 336, 338. The in-vehicle infotainment system 328 of the second vehicle 304 has a processor 340, memory 342, and transceiver 344 that function in a similar manner to their counterpart processor 322, memory 324, and transceiver 326 in the first vehicle's in-vehicle infotainment system 310. The central server 306 has a processor 346, memory 348, and transceiver 350. The processor 346 analyzes data and other information from the first vehicle 302 and the second vehicle 304. The memory 348 stores information that is received by the central server 306. The transceiver 350 sends and receives data from the first vehicle 302 and second vehicle 304.

Figure 4:
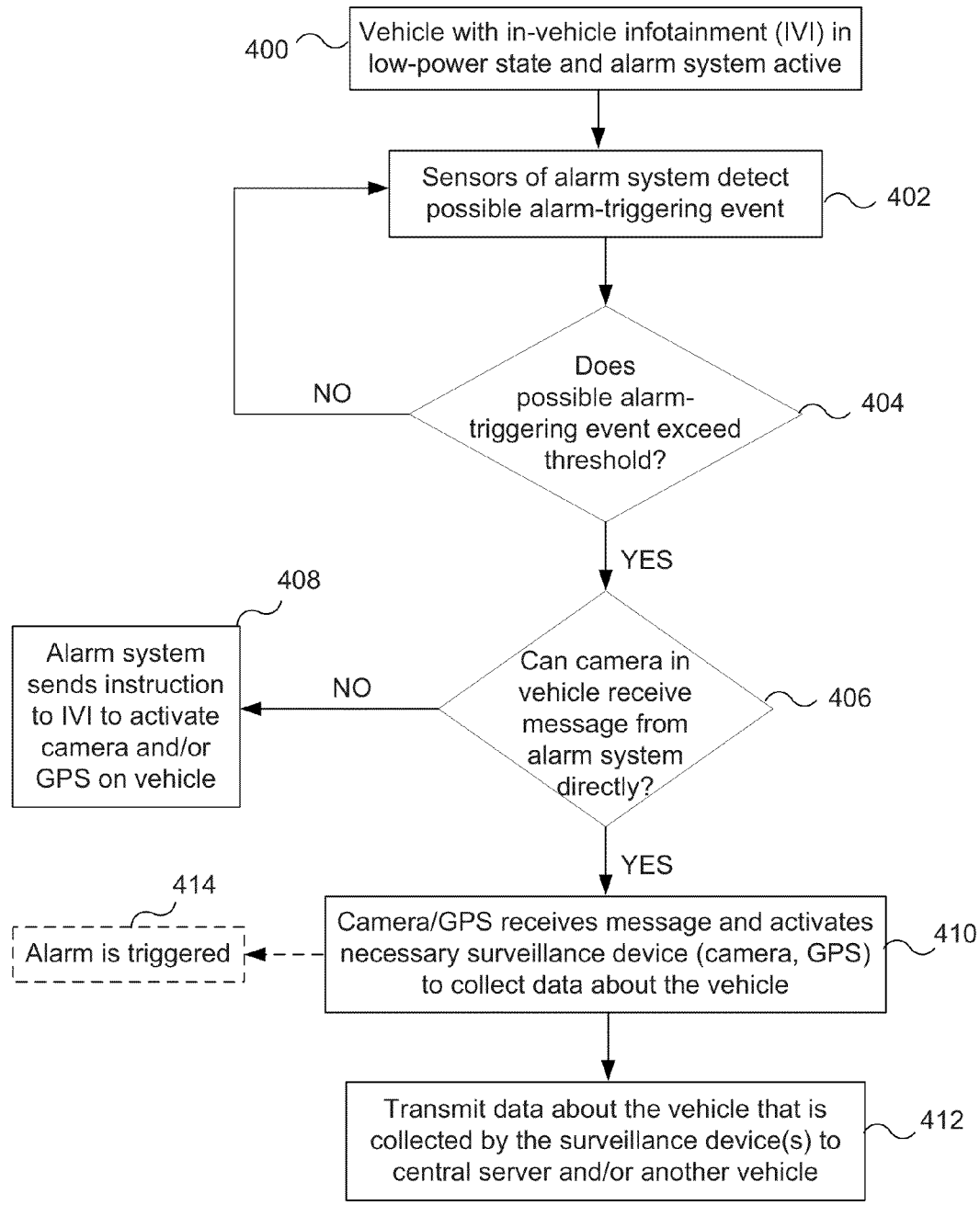
FIG. 4 is a flow diagram of an example method in a vehicle in which an alarm-triggering event occurs, according to embodiments.
Figure 5:
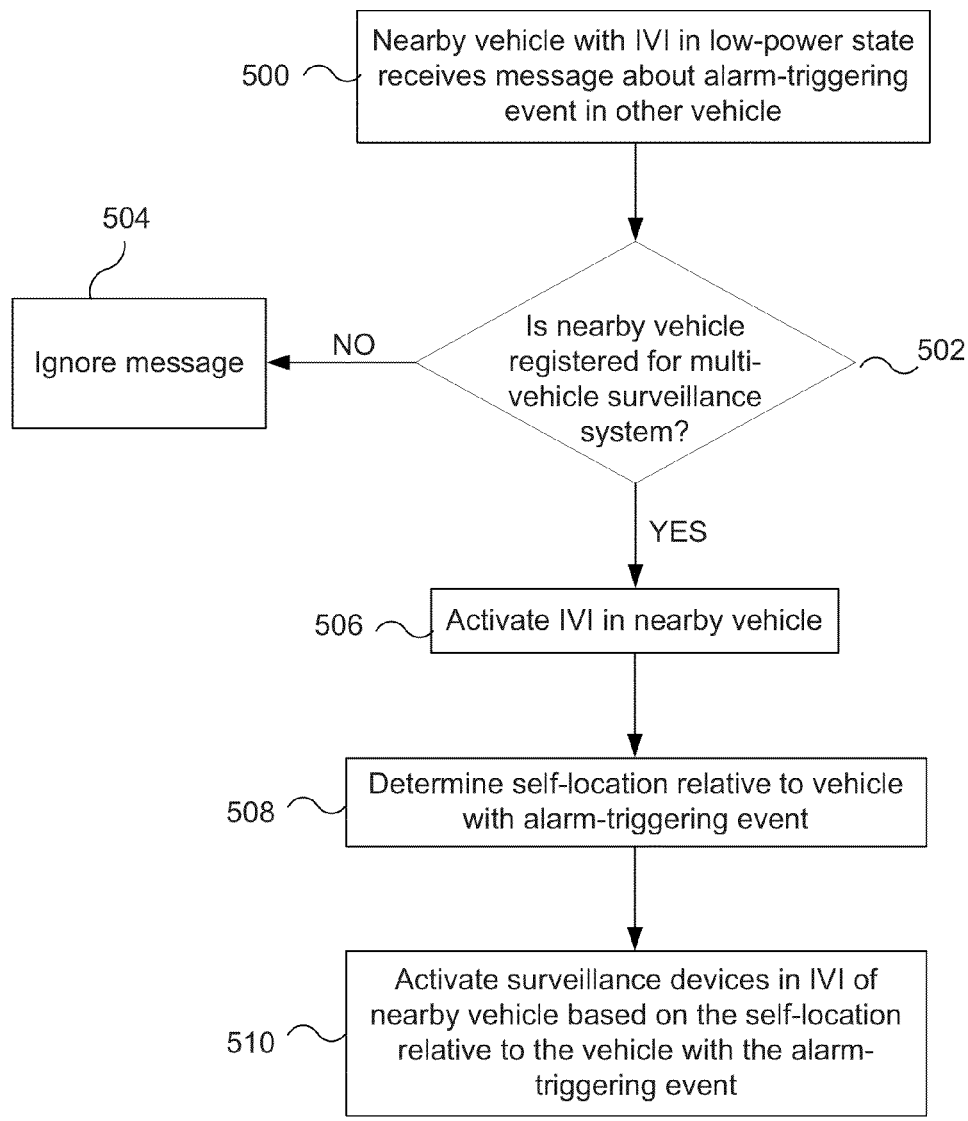
FIG. 5 is a flow diagram of an example method in a vehicle proximate the vehicle where the alarm-triggering event occurs, according to embodiments.

FIGS. 4 and 5 show steps of how an alarm-triggering event is handled in both the first vehicle and the second vehicle shown in FIG. 3. FIG. 4 shows an example of steps that occur in the first vehicle when the alarm-triggering event is sensed. The first vehicle's in-vehicle infotainment system is in a low power state and the alarm system is active in a process 400. The sensors of the alarm system detect a possible alarm-triggering event in a process 402. The processor of the first vehicle analyzes the data sensed by the sensors to determine whether the alarm-triggering event exceeds a predetermined threshold in a process 404. If the threshold is not exceeded, then no additional steps are performed and the surveillance system waits for another alarm-triggering event to occur. If the threshold is exceeded, then the in-vehicle infotainment system determines whether the first surveillance device, in this case a camera, can receive a message directly from the alarm system in a process 406. If the camera cannot receive a direct message from the alarm system, then the camera sends a message to the processor of the in-vehicle infotainment system to activate the camera and/or the GPS in a process 408, which is the second surveillance device, in this example. If the camera can receive a direct message from the alarm system, a message is sent directly from the alarm system to the camera to activate the camera and the GPS system to collect information about the vehicle in a process 410. The data collected about the vehicle is then transmitted to the central server, another vehicle, or any other authorized entity in a process 412. Some configuration(s) include triggering a sensory alarm in a process 414, such as an audible alarm. The alarm system in the example shown in FIG. 4 is triggered after the vehicle's camera and GPS have been activated to collect information about the vehicle, although the alarm may be triggered at other times, such as before any surveillance devices are activated.

FIG. 5 shows an example of steps that occur in the second vehicle that is near the first vehicle when the alarm-triggering event is sensed in the first vehicle. The second vehicle is nearby or generally proximate to the first vehicle and its in-vehicle infotainment system is in a low-power state when it receives a message about the alarm-triggering event that occurs in the first vehicle in a process 500. The second vehicle determines whether the vehicle where the alarm-triggering event occurred is included within the multi-vehicle surveillance system in a process 502. If not, the message is ignored in a process 504. If the vehicle where the alarm-triggering event occurred is included in the surveillance system, the second vehicle's in-vehicle infotainment is activated in a process 506. The processor of the in-vehicle infotainment system determines the self-location of the second vehicle relative to the first vehicle where the alarm-triggering event occurred in a process 508. One or both of the first surveillance device and the second surveillance device of the second vehicle are activated by the second vehicle's in-vehicle infotainment system based on the self-location relative to the first vehicle where the alarm-triggering event occurred in a process 510.

Many of the features of the surveillance methods and systems described above include computing elements, such as servers, processors, and the like. A person skilled in the art will appreciate that software, firmware, or some combination thereof may be used to perform one or more of the functions of the disclosed vehicle surveillance systems. For example, software and/or firmware may be used to determine the location of the vehicle within the surveillance system, identify the correct surveillance devices to activate, determine whether an alarm message should be generated and to whom it should be sent, and the like. Further, software and/or firmware may be included in the computing elements of the vehicle's sub-systems to facilitate communication between the in-vehicle sub-systems, either directly or through the central server. The software and/or firmware may be any suitable computer-readable medium that has computer-executable instructions that may be executed by any computing machine or other computing device.

It will be appreciated that variations of the above-disclosed surveillance systems and other features and functions, or alternatives thereof, may be desirably combined into many other different systems, methods, or applications. Also various presently unforeseen or unanticipated alternatives, modifications, variations, or improvements therein may be subsequently made by those skilled in the art which also are intended to be encompassed by the following claims.

What is claimed is:

1. A method of vehicle surveillance, comprising:
receiving data from a sensor monitoring a first vehicle that indicates an alarm-triggering event;
activating a first surveillance device based on the data that indicates the alarm-triggering event;
activating a second surveillance device based on the data that indicates the alarm-triggering event, wherein the second surveillance device is secured to a second vehicle that is proximate to the first vehicle;
collecting information about the first vehicle by the first surveillance device and the second surveillance device; and
receiving the information collected by the first surveillance device and the second surveillance device.

2. The method of claim 1, wherein the data from the sensor monitoring the first vehicle and the information collected by the first surveillance device and the second surveillance device is received at a central server.

3. The method of claim 1, wherein at least one of the data from the sensor monitoring the first vehicle and the information collected by the first surveillance device is received by the second vehicle.

4. The method of claim 1, wherein the sensor is secured to the first vehicle.

5. The method of claim 1, wherein the data sensed by the sensor is received by an in-vehicle computing system located within the first vehicle.

6. The method of claim 1, further comprising generating an alarm message based at least in part on the information collected by the first surveillance device and the second surveillance device.

7. The method of claim 1, wherein the first surveillance device is secured to the first vehicle.

8. The method of claim 1, wherein the first surveillance device is secured to the second vehicle.

9. The method of claim 1, wherein the first surveillance device includes a camera that is included in a non-vehicle security system.

10. A surveillance method, comprising:
   receiving data from a sensor secured to a first vehicle, the data indicating an alarm-triggering event;
   activating a first surveillance device;
   collecting data about the first vehicle by the first surveillance device;
   determining a location of the first vehicle based on data collected by the first surveillance device;
   sending an instruction to activate a second surveillance device, wherein the second surveillance device is selected based at least in part on the determined location of the first vehicle, wherein the second surveillance device is at a second vehicle that is proximate the first vehicle;
   collecting data about at least one of the first vehicle and the area around the first vehicle by the second surveillance device; and
   receiving data about the first vehicle collected by the first surveillance device and the second surveillance device.

11. The surveillance method of claim 10, wherein at least one of the data from the sensor and the data collected by the first surveillance device are received by the second vehicle.

12. The surveillance method of claim 10, further comprising sharing the data with authorized users.

13. The surveillance method of claim 10, wherein the first surveillance device is secured to the first vehicle.

14. The surveillance method of claim 10, wherein the second surveillance device is secured to the second vehicle.

15. A surveillance system, comprising:
   a first sensor secured to a first vehicle;
   a first surveillance device;
   a central server electrically coupled to the first sensor and the first surveillance device, the central server including:
     a processor configured to:
       receive data from the first sensor and determine that the data indicates an alarm-triggering event;
       send an instruction to activate the first surveillance device and to collect data about the first vehicle by the first surveillance device;
       determine a location of the first vehicle based on the data collected by the first surveillance device;
       send an instruction to activate a second surveillance device that is remote from the first surveillance device based at least in part on the determined location of the first vehicle, wherein the second surveillance device is secured to a second vehicle selected from a plurality of vehicles based at least in part on the determined location of the first vehicle, and send an instruction to collect data about at least one of the first vehicle and an area around the first vehicle by the second surveillance device; and
     a memory for storing the data collected by the first surveillance device and the second surveillance device.

16. The surveillance system of claim 15, wherein the first surveillance device is secured to the first vehicle.

17. The surveillance system of claim 15, wherein the data stored in the memory is accessible by authorized users that include at least one of law enforcement and other vehicles positioned near the first vehicle.

18. A vehicle surveillance device, comprising:
   a sensor monitoring a first vehicle;
   a first surveillance device secured to the first vehicle;
   a transceiver electrically coupled to the sensor and the first surveillance device and configured to:
     receive data from the sensor indicating that an alarm-triggering event occurred;
     send the data sensed by the sensor to a central server;
     receive an instruction from the central server to activate the first surveillance device; and
     send data collected by the first surveillance device to the central server; and
   a second surveillance device at a second vehicle proximate the first vehicle, the second surveillance device configured to receive from the central server at least a portion of the data collected by the first surveillance device.

19. The vehicle surveillance device of claim 18, wherein the sensor is secured to the first vehicle.

20. The vehicle surveillance device of claim 18, wherein the transceiver is further configured to send an instruction to trigger an alarm based at least in part on the alarm-triggering event.

21. A vehicle surveillance device, comprising:
   a surveillance device secured to a first vehicle;
   a transceiver electrically coupled to the surveillance device and configured to:
     receive data that indicates that an alarm-triggering event occurred in a second vehicle;
     receive an instruction to activate the surveillance device secured to the first vehicle and collect information about the second vehicle with the first surveillance device; and
     send a data message that includes the information collected by the first surveillance device to a central server.

* * * * *